United States Patent
Oishi et al.

(10) Patent No.: US 9,753,592 B2
(45) Date of Patent: Sep. 5, 2017

(54) CONTROL CIRCUIT OF ELECTROSTATIC CAPACITIVE SENSOR AND ELECTRONIC DEVICE USING THE SAME

(71) Applicant: ROHM CO., LTD., Ukyo-ku, Kyoto (JP)

(72) Inventors: Yuki Oishi, Kyoto (JP); Yo Yamashiro, Kyoto (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 14/736,805

(22) Filed: Jun. 11, 2015

(65) Prior Publication Data

US 2015/0277631 A1 Oct. 1, 2015

Related U.S. Application Data

(63) Continuation-in-part of application No. 13/839,844, filed on Mar. 15, 2013, now Pat. No. 9,357,045.

(30) Foreign Application Priority Data

Mar. 19, 2012 (JP) .................................. 2012-62291

(51) Int. Cl.
G06F 3/045 (2006.01)
G06F 3/044 (2006.01)
G06F 3/041 (2006.01)

(52) U.S. Cl.
CPC ............ G06F 3/044 (2013.01); G06F 3/0416 (2013.01); G06F 2203/04108 (2013.01); H04M 2250/12 (2013.01); H04M 2250/22 (2013.01)

(58) Field of Classification Search
CPC .. H04M 1/23; H04M 1/0266; H04M 1/72569; H04M 2250/12; H04M 2250/22;
(Continued)

(56) References Cited

U.S. PATENT DOCUMENTS 7,551,814 B1 6/2009 Smits
2006/0197750 A1 9/2006 Kerr
(Continued)

FOREIGN PATENT DOCUMENTS

JP 201249688 A 3/2012
WO WO2009078944 A1 6/2009

OTHER PUBLICATIONS

Japanese Notification of Reasons for Refusal for corresponding Application No. 2012-062291 dated of mailing Mar. 22, 2016, with English Translation Summary.
(Continued)

Primary Examiner — Kwang-Su Yang
(74) Attorney, Agent, or Firm — Cantor Colburn LLP

(57) ABSTRACT

An electrostatic capacitive sensor includes a plurality of transmitter electrodes, a plurality of receiver electrodes, and a control circuit. The control circuit includes: a transmitter circuit configured to apply a periodical transmission signal to each of the plurality of transmitter electrodes; and a receiver circuit configured to generate, based on a reception signal generated in each of the plurality of receiver electrodes in response to the transmission signal, a detection signal indicating a change in electrostatic capacitance formed at each of intersections of the plurality of transmitter electrodes and the plurality of receiver electrodes, wherein the transmitter circuit and the receiver circuit are configured to switch between a first mode and a second mode, in the first mode, the transmission/reception signal is sequentially applied/monitored and in the second mode, the plurality of transmitter/receiver electrodes are grouped so that the same signal is applied to the same group.

2 Claims, 16 Drawing Sheets

(58) Field of Classification Search
CPC .................. G06F 3/0416; G06F 3/044; G06F 2203/04108
USPC ................................................ 345/173, 174
See application file for complete search history.

(56) References Cited

U.S. PATENT DOCUMENTS

| | | |
|---|---|---|
| 2007/0236460 A1 | 10/2007 | Young et al. |
| 2009/0309851 A1 | 12/2009 | Bernstein |
| 2012/0050216 A1 | 3/2012 | Kremin et al. |
| 2012/0056835 A1 | 3/2012 | Choo et al. |
| 2012/0105752 A1* | 5/2012 | Park .................... G02F 1/13338 349/33 |
| 2012/0127124 A1 | 5/2012 | Zanone et al. |
| 2012/0293451 A1 | 11/2012 | Van Schyndel et al. |
| 2013/0050130 A1 | 2/2013 | Brown |
| 2013/0157726 A1 | 6/2013 | Miyazaki et al. |
| 2016/0259474 A1* | 9/2016 | King .................... G06F 3/0416 |

OTHER PUBLICATIONS

Non-Final Office Action corresponding to U.S. Appl. No. 13/839,844; Date of Mailing: Jun. 11, 2015.
U.S. Non-Final Office Action corresponding to U.S. Appl. No. 15/157,689; Mailing date of Apr. 20, 2017.

* cited by examiner

FIG. 9

|  | Transmitter | Receiver |
|---|---|---|
| First condition | First mode | First mode |
|  | Second mode | Second mode |
| Second condition | First mode | Second mode |
|  | Second mode | First mode |

CONTROL CIRCUIT OF ELECTROSTATIC CAPACITIVE SENSOR AND ELECTRONIC DEVICE USING THE SAME

CROSS-REFERENCE TO RELATED APPLICATION

This application is a Continuation-in-part of application Ser. No. 13/839,844, filed Mar. 15, 2013, the entire contents of which are incorporated herein by reference; and is based upon and claims the benefit of priority under 35 U.S.C. §119 to Japan Patent Application No. 2012-62291, filed on Mar. 19, 2012, the entire contents of which are incorporated herein by reference.

TECHNICAL FIELD

The present disclosure relates to a mutual capacitance type touch panel.

BACKGROUND

In recent years, electronic equipment such as computers, mobile phones, tablet PCs (personal computers), PDAs (personal digital assistants) and so on have become mainstream and now also include touch panels as input devices for manipulating the electronic equipment through the touch of a finger. Mutual capacitance type touch panels are developed for these types of devices.

A mobile phone ceases to detect whether or not a touch panel is touched when a user puts his/her ear to the mobile phone for calling. In this case, the contact of his/or her head to the touch panel of the mobile phone will not be detected as the action of touching the touch panel. In addition, when the user puts his/her ear to the mobile phone for calling, a display of the mobile phone is turned off in order to save power. Such type of a mobile phone has an optical proximity sensor disposed at a position corresponding to the head of the user when calling. The proximity sensor includes a pair of a light emitting device and a light receiving device. The light receiving device detects light emitted from the light emitting device and reflected by a detection target such as a user's head.

However, the use of the optical proximity sensors increases the number of components and production costs of the mobile phone. In addition, a light passage needs to be provided in the housing of the mobile phone, which restricts the design of the mobile phone.

SUMMARY

The present disclosure provides some embodiments of a mutual capacitance type electrostatic capacitive sensor which can be also used as a proximity sensor.

According to one aspect of the present disclosure, there is provided a control circuit of an electrostatic capacitive sensor including a plurality of transmitter electrodes disposed in parallel in a first direction and a plurality of receiver electrodes disposed in parallel in a second direction and spaced apart from the plurality of transmitter electrodes by specific intervals. The control circuit includes: a transmitter circuit configured to apply a periodical transmission signal to each of the plurality of transmitter electrodes; and a receiver circuit configured to generate, based on a reception signal generated in each of the plurality of receiver electrodes in response to the transmission signal, a detection signal indicating a change in electrostatic capacitance formed at each of intersections of the plurality of transmitter electrodes and the plurality of receiver electrodes. The transmitter circuit is configured to switch between a first mode where the transmission signal is sequentially applied to the plurality of transmitter electrodes and a second mode where the plurality of transmitter electrodes is grouped and the same transmission signal is applied to a plurality of transmitter electrodes belonging to the same group. The receiver circuit is configured to switch between a first mode where the reception signal generated in each of the plurality of receiver electrodes is sequentially monitored to generate the detection signal for each of the receiver electrodes, and a second mode where the plurality of receiver electrodes are grouped into one or more groups and receiver electrodes belonging to the same group are connected in common to generate the detection signal for each group.

In the second mode, the plurality of transmitter electrodes belonging to the same group acts as a single electrode having a large area. As a result, detection sensitivity of the change in capacitance can be increased and accordingly it is possible to detect a condition where a detection target is in proximity to the panel and not directly contacting to the panel.

In the second mode, the plurality of receiver electrodes belonging to the same group acts as a single electrode having a large area. As a result, detection sensitivity of the change in capacitance can be increased and accordingly it is possible to detect a condition where a detection target is in proximity to the panel and not directly contacting to the panel. Further, a combination of the mode of the receiver circuit and the mode of the transmitter circuit can change the detection sensitivity and the spatial resolution.

In some embodiments, the transmitter circuit may be set to the first mode when the electrostatic capacitive sensor is operated as a touch panel and may be set to the second mode when the electrostatic capacitive sensor is operated as a proximity sensor.

In some embodiments, the transmitter circuit may be configured such that the number of groups can be changed in the second mode. In other words, the number of electrodes belonging to the same group may be changed. Thus, it is possible to change sensitivity and a spatial resolution in the first direction which are in a trade-off relationship gradually.

In some embodiments, the control circuit may further include a controller configured to control an operation mode of the transmitter circuit. The controller may switch between a first condition where the transmitter circuit is fixedly set to the first mode and a second condition where the transmitter circuit is set to alternate between the first mode and the second mode in a time-divisional manner. Before the user contacts the panel, both of proximity and touch can be monitored by setting the transmitter circuit to the second condition. After the touch is detected, a touched coordinate can be detected with a spatial resolution by setting the transmitter circuit to the first condition.

In some embodiments, the receiver circuit may be configured such that the number of groups can be changed in the second mode. In other words, the number of electrodes belonging to the same group may be changed. Thus, it is possible to change sensitivity and a spatial resolution in the second direction which are in a trade-off relationship gradually.

In some embodiments, the control circuit may further include a controller configured to control operation modes of the transmitter circuit and the receiver circuit. The controller may switch between a first condition where the transmitter circuit and the receiver circuit are fixedly set to the first mode and a second condition where the transmitter circuit and the receiver circuit are set to alternate between the first mode and the second mode in a time-divisional manner.

According to another aspect of the present disclosure, there is provided a control circuit of an electrostatic capacitive sensor including: a transmitter circuit configured to apply a periodical transmission signal to each of a plurality of transmitter electrodes; and a receiver circuit configured to generate, based on a reception signal generated in each of the plurality of receiver electrodes in response to the transmission signal, a detection signal indicating a change in electrostatic capacitance formed at each of intersections of the plurality of transmitter electrodes and a plurality of receiver electrodes. The receiver circuit is configured to switch between a first mode where the reception signal generated in each of the plurality of receiver electrodes is sequentially monitored to generate the detection signal for each of the receiver electrodes and a second mode where the plurality of receiver electrodes are grouped into one or more groups and receiver electrodes belonging to the same group is connected in common to generate the detection signal for each group.

In the second mode, the plurality of receiver electrodes belonging to the same group acts as a single electrode having a large area. As a result, detection sensitivity of the change in capacitance can be increased and accordingly it is possible to detect a condition where a detection target is in proximity to the panel and not directly contacting to the panel.

In some embodiments, the receiver circuit may be set to the first mode when the electrostatic capacitive sensor is operated as a touch panel and may be set to the second mode when the electrostatic capacitive sensor is operated as a proximity sensor.

In some embodiments, the receiver circuit may be configured such that the number of groups can be changed in the second mode.

In some embodiments, the control circuit may further include a controller configured to control an operation mode of the receiver circuit. The controller may switch between a first condition where the receiver circuit is fixedly set to the first mode and a second condition where the receiver circuit is set to alternate between the first mode and the second mode in a time-divisional manner.

According to another aspect of the present disclosure, there is provided an electronic equipment including: a housing; a display panel disposed on one surface of the housing; an electrostatic capacitive sensor disposed at an overlapping portion of the housing with the display panel, the electrostatic capacitive sensor including a plurality of transmitter electrodes disposed in parallel in a first direction and a plurality of receiver electrodes disposed in parallel in a second direction and spaced apart from the plurality of transmitter electrodes by specific intervals; the control circuit according to the above aspects, which is disposed within the housing and detects a change in capacitance of the electrostatic capacitive sensor; and a processor configured to receive a digital value corresponding to the detection signal generated by the receiver circuit of the control circuit and detects a manipulation status of the electronic equipment by a user based on the digital value.

In some embodiments, the electronic equipment may be a mobile terminal and the electronic equipment may further include a speaker disposed at a position close to a user' ear when calling. The processor may refer to the digital value obtained in the second mode and determine that the user approaches the housing to the user' head for calling if a change in capacitance formed by the transmitter and the receiver electrodes disposed in the vicinity of the speaker increases. Accordingly, it is possible to detect proximity of a user's head by using the electrostatic capacitive sensor for use in a touch panel, without using an optical proximity sensor.

In some embodiments, the processor may refer to the digital value obtained in the second mode and determine that a user grips the housing if a change in capacitance of the transmitter and the receiver electrodes disposed at one end of the housing to which the user' thumb approaches when the housing is gripped by the user and the transmitter and the receiver electrodes disposed at the other end of the housing to which the other fingers approach increase.

Other aspects of the present disclosures may include any combinations of the above-described elements or conversion of expression of the present disclosure between methods, apparatuses and so on.

According to the aspects of the present disclosure, a mutual capacitance type electrostatic capacitive sensor can be used as a proximity sensor.

BRIEF DESCRIPTION OF THE DRAWINGS

FIG. 9 is a matrix table showing the mode combinations of a transmitter circuit and a receiver circuit based on the conditions set by the controller according to a third embodiment.

DETAILED DESCRIPTION

Figure 1:
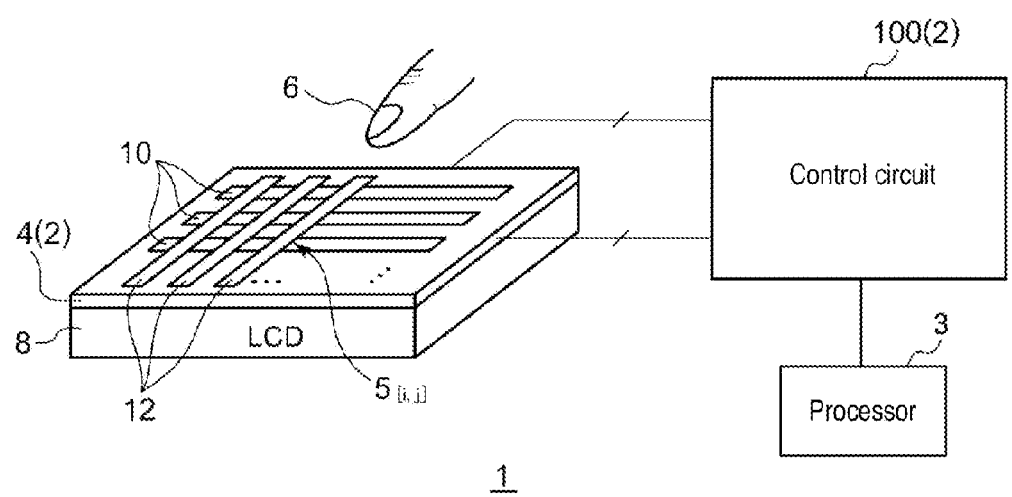
FIG. 1 is a circuit diagram showing a configuration of electronic equipment including a touch panel input device according to a first embodiment.

Embodiments of the present disclosure will now be described in detail with reference to the drawings. Throughout the drawings, the same or similar elements, members and processes are denoted by the same reference numerals, and explanations of which will not be repeated. The embodiments will be presented by way of example only, and are not intended to limit the scope of the disclosures. Indeed, all the features and configurations of the embodiments are not essential to the present disclosure.

Throughout the description, "a state where a member A and a member B is coupled" may include not only a state where the member A and the member B is physically directly connected but also a state where the member A and the member B is indirectly coupled via another member, unless the another member substantially affects the electrical connection state between the members A and B or damages main functions or effects of the connection between the members A and B.

Similarly, "a state where a member C is provided between a member A and a member B" may include not only a state where the member C is physically directly connected to the member A or the member B but also a state where the member C is indirectly connected to the member A or the member B via another member, unless the another member substantially affects the electrical connection state between the members A and C or between the members B and C or damages main functions or effects of the connection between the members A and C or between the member B and C.

First Embodiment

FIG. 1 is a circuit diagram showing a configuration of electronic equipment 1 including a touch panel input device 2 (simply referred to as an "input device 2") according to a first embodiment. The input device 2 is disposed on a surface of an LCD (liquid crystal display) 8, for example, and acts as a touch panel. The input device 2 determines X and Y coordinates of a point touched by a user's finger, a pen or the like (hereinafter representatively referred to as a "detection target 6").

The input device 2 includes an electrostatic capacitive sensor 4, a control circuit (capacitance detecting circuit) 100 and a processor 3. The electrostatic capacitive sensor 4 is a mutual capacitance type touch panel in a matrix form. More specifically, the electrostatic capacitive sensor 4 includes M number of transmitter electrodes $10_{[1-M]}$ (M is an integer of 2 or more) disposed in parallel in a first direction in columns of the matrix and N number of receiver electrodes $12_{[1-N]}$ (N is an integer of 2 or more) disposed in parallel in a second direction in rows of the matrix. The allocation of the transmitter electrodes 10 and the receiver electrodes 12 at the rows and the columns may be in reverse. The transmitter electrodes 10 and the receiver electrodes 12 are arranged to be spaced apart from each other in the vertical direction. The transmitter electrodes 10 and the receiver electrodes 12 are capacitively coupled to each other at each of intersections of the transmitter electrodes 10 and the receiver electrodes 12. More specifically, a pair of one transmitter electrode 10 and one receiver electrode 12 forms a capacitive sensor unit 5 at the intersection thereof. That is, the electrostatic capacitive sensor 4 includes a plurality of capacitive sensor units 5 arranged in a matrix form. For convenience of explanation, a capacitive sensor disposed at the i-th row and the j-th column (i and j are integers) will be denoted by a capacitive sensor unit $5_{[i,j]}$. When an object such as a finger, a pen or the like is touched to or approaches the capacitive sensor unit $5_{[i,j]}$, a mutual capacitance $C_{M[i,j]}$ of the capacitive sensor unit $5_{[i,j]}$ is changed.

The control circuit 100 detects changes in mutual capacitances $C_M$ of the capacitive sensor units 5 having different coordinates in the capacitive sensor unit 4. More specifically, the control circuit 100 cyclically and sequentially applies transmission signals to the plurality of transmitter electrodes 10 and selects a transmitter electrode 10 on which a capacitance detection is to be performed. Then, the control circuit 100 detects a change in electrostatic capacitance of the capacitive sensor unit 5 formed between the selected transmitter electrode 10 and each of the plurality of receiver electrodes 12. The selected transmitter electrode 10 corresponds to a column coordinate and a receiver electrode 12 which has undergone a change in capacitance corresponds to a row coordinate. Data representing the change in capacitance is transmitted to the processor 3. The processor 3 determines a coordinate touched by a user based on the change in capacitance of each coordinate.

The electronic equipment 1 has been outlined in the above. Below, the control circuit 100 according to the first embodiment will be now described in more details.

Figure 2:
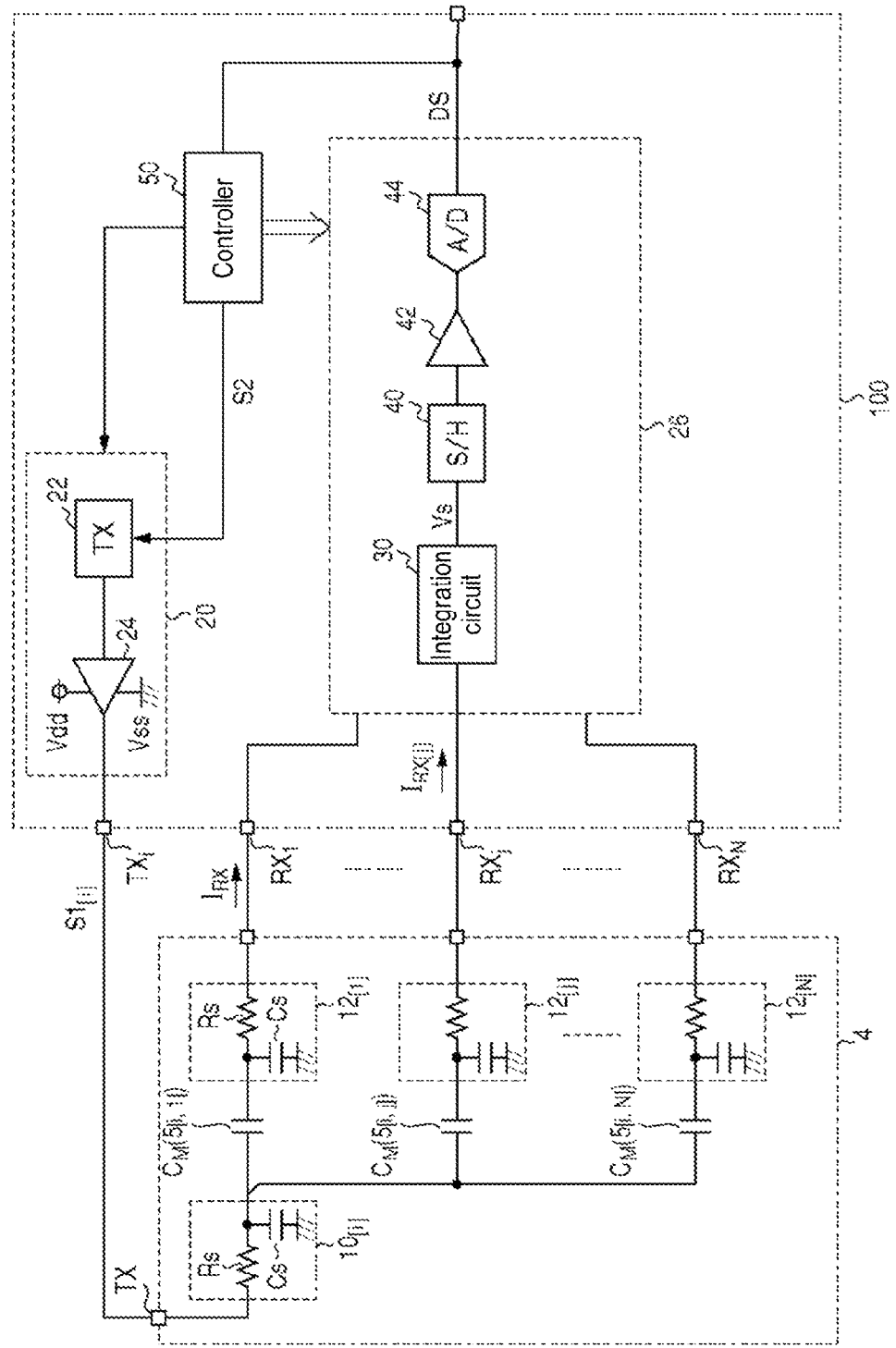
FIG. 2 is a circuit diagram showing a configuration of the input device having a control circuit according to the first embodiment.

FIG. 2 is a circuit diagram showing a configuration of the input device 2 having the control circuit 100 according to the first embodiment. Only a portion relating to one transmitter electrode $10_{[i]}$ is shown in FIG. 2.

The transmitter electrode $10_{[i]}$ is capacitively coupled to a plurality of receiver electrodes $12_{[1]}$ to $12_{[N]}$ and forms capacitive sensor units $5_{[i, 1]}$ to $5_{[i,N]}$ having mutual capacitances $C_M$ with the receiver electrodes $12_{[1]}$ to $12_N$, respectively. Reference symbol Rs denotes resistances of the transmitter electrode 10 and the receiver electrodes 12, and reference symbol Cs denotes capacitances thereof. Though not shown in FIG. 2, the capacitive sensor units 5 may also be formed between other transmitter electrodes 10 and the receiver electrodes $12_{[1]}$ to $12_{[N]}$ in a similar manner as shown in FIG. 2.

The control circuit 100 includes a transmitter circuit 20, a receiver circuit 26 and a controller 50.

The control circuit 100 also has transmitter (TX) terminals $TX_{[1\ to\ M]}$ and receiver (RX) terminals $RX_{[1\ to\ N]}$ formed for the respective receiver electrodes 12. TX terminal $TX_{[i]}$ of the control circuit 100 is connected to a corresponding transmitter electrode $10_{[i]}$ and RX terminal $RX_{[j]}$ of the control circuit 100 is connected to a corresponding receiver electrode $12_{[j]}$.

The transmitter circuit 20 generates a periodical transmission signal S1 and applies it to the transmitter electrodes $10_{[1\ to\ M]}$. The transmitter circuit 20 has a signal generator 22 and a driver 24 provided for each transmitter electrode 10. The signal generator 22 generates a periodical clock signal. The driver 24 receives this clock signal and outputs a transmission signal S1 in synchronization with the clock signal to the transmitter electrode 10. The transmission signal S1 is a periodical signal which alternates between a first voltage level (for example, a power source voltage $V_{dd}$) and a second voltage level (for example, a ground voltage $V_{SS}$).

When the electrostatic capacitive sensor 4 is used as a touch panel, the transmitter circuit 20 selects (or scans) a plurality of transmitter electrodes $10_{[1\ to\ M]}$ in a time-divisional manner and applies the transmission signal S1 to a selected transmitter electrode 10 while a fixed voltage level (for example, the ground voltage $V_{SS}$) is applied to the remaining transmitter electrodes 10.

The receiver circuit 26 generates, based on a reception signal $I_{RX}$ generated in each of the plurality of receiver electrodes $12_{[1\ to\ N]}$ in response to the transmission signal S1, detection signals Vs indicating changes in mutual capacitances $C_{M[1,1]}$ to $C_{M[M,N]}$ of a plurality of capacitive sensor units 5 formed at intersections of the plurality of transmitter electrodes $10_{[1 \text{ to } M]}$ and the plurality of receiver electrodes $12_{[1 \text{ to } N]}$.

The receiver circuit 26 includes an integration circuit 30, a sample hold circuit 40, an amplifier 42 and an A/D converter 44. Some or all parts of the receiver circuit 26 may be provided for each of the receiver electrodes 12. Some or all parts of the receiver circuit 26 may be provided every several receiver electrodes 12 and shared by the several receiver electrodes 12 in a time-divisional manner.

An integration circuit 30 allocated to a j-th receiver electrode $12_{[j]}$ detects changes in mutual capacitances $C_{M[1,j]}$ to $C_{M[M,j]}$ of the capacitive sensor units $5_{[1,j]}$ to $5_{[M,j]}$ formed by the receiver electrode $12_{[j]}$ and generates a detection signal Vs having a level according to the changes in capacitances based on a reception signal $I_{RX[j]}$. Specifically, the reception signal $I_{RX}$ is a current signal and the detection single Vs is a voltage signal, and the integration circuit 30 integrates the current $I_{RX}$ and generates the detection voltage Vs according to the changes in capacitances. The integration circuit 30 may employ a well-known circuit or a circuit which will be described later, without being particularly limited in its configuration and type.

The sample hold circuit 40 samples and holds the detection voltage Vs generated from the integration circuit 30. The amplifier 42 amplifies the sampled and held detection voltage Vs when necessary. The A/D converter 44 converts the amplified detection voltage Vs into a digital value Ds indicating a change in capacitance of each capacitive sensor unit 5.

The controller 50 controls an operation sequence of the transmitter circuit 20 and the receiver circuit 26. In addition, the controller 50 controls an operation mode of the transmitter circuit 20, which will be described later.

In the first embodiment, the transmitter circuit 20 is configured to switch between a first mode and a second mode. In the first mode, the transmitter circuit 20 sequentially applies the transmission signal S1 to the plurality of transmitter electrodes $10_{[1 \text{ to } M]}$. In the second mode, the transmitter circuit 20 virtually classifies the plurality of transmitter electrodes $10_{[1 \text{ to } M]}$ into at least one group and simultaneously applies the same transmission signal S1 to a plurality of transmitter electrodes 10 belonging to the same group.

Figure 3A:
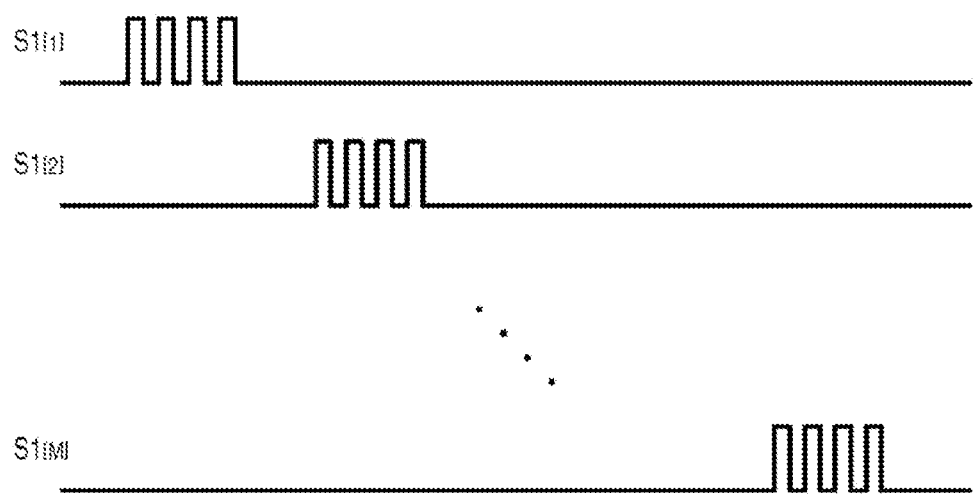
FIGS. 3A and 3B are operation waveform diagrams of a transmitter circuit in a first mode and a second mode, respectively.
Figure 3B:
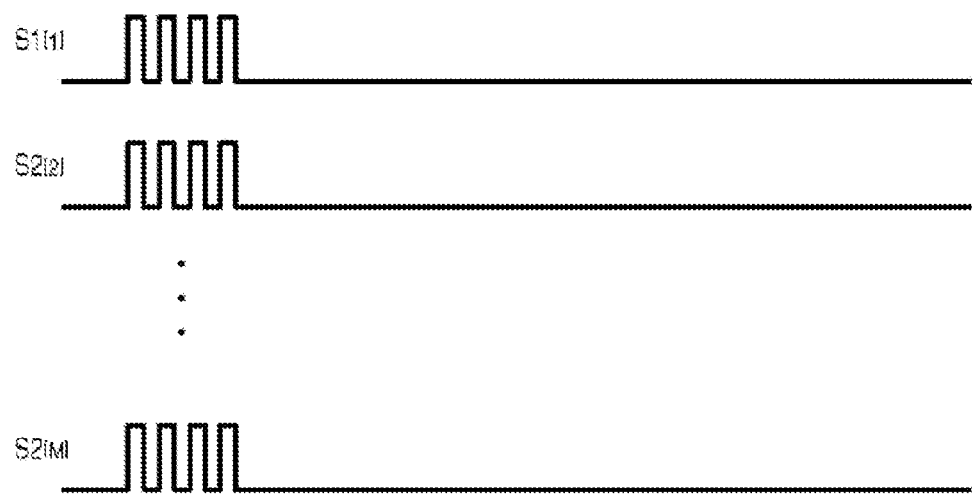

FIGS. 3A and 3B are operation waveform diagrams of the transmitter circuit 20 in the first mode and the second mode, respectively. As shown in FIG. 3A, in the first mode, the plurality of transmitter electrodes $10_{[1 \text{ to } M]}$ is sequentially scanned and the transmission signal S1 is applied to a selected transmitter electrode in a time-divisional manner. In the second mode of FIG. 3B, the plurality of transmitter electrodes $10_{[1 \text{ to } M]}$ belongs to a single group and the common transmission signal S1 is applied to all of the transmitter electrodes $10_{[1 \text{ to } M]}$.

In the second mode, the number of groups of transmitter electrodes may be one or more. In some embodiments, the number of groups, in other words, the number of transmitter electrodes 10 belonging to a single group may be changed.

Figure 4A:
FIGS. 4A to 4C are operation waveform diagrams of a transmitter circuit where the number of groups is 1 to 3, respectively.
Figure 4B:
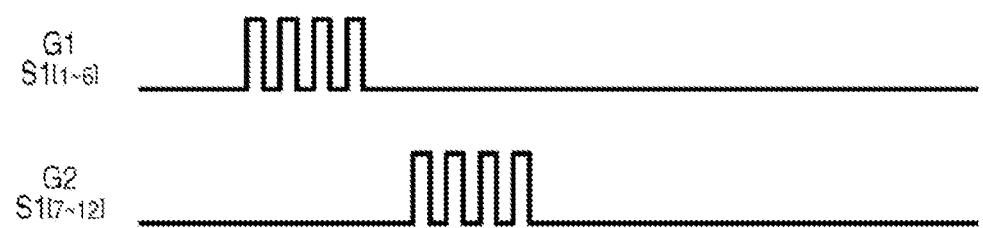
Figure 4C:
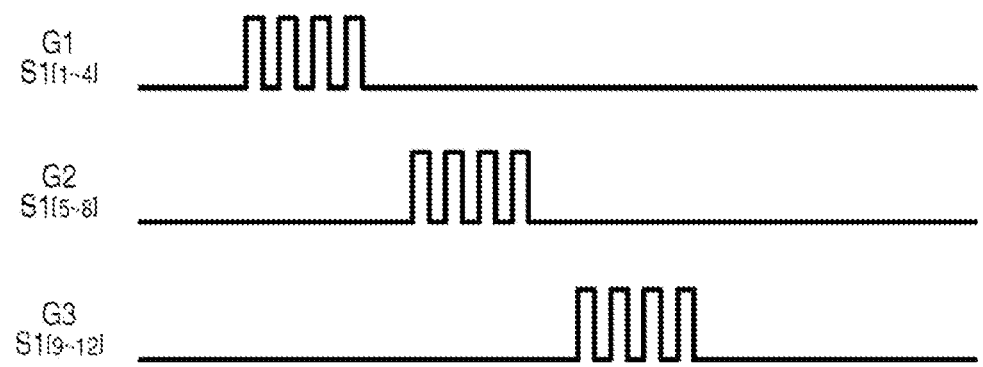

FIGS. 4A to 4C are operation waveform diagrams of M number of the transmitter circuit 20 where the number of groups is 1 to 3, respectively. In FIG. 4A, a single group G1 is formed and the same transmission signal S1 is simultaneously applied to all transmitter electrodes $10_{[1 \text{ to } M]}$ belonging to the group G1. In FIG. 4B, two groups G1 and G2 are formed and are sequentially scanned. During a period of time when the group G1 is selected, the transmission signal S1 is applied to the transmitter electrodes $10_{[1 \text{ to } 6]}$ belonging to the group G1. During a period of time when the group G2 is selected, the transmission signal S1 is applied to the transmitter electrodes $10_{[7 \text{ to } 12]}$ belonging to the group G2. FIG. 4C shows a case where three groups are formed. It is also to be understood that four and six groups may be formed without departing from the spirit and scope of the present disclosure.

Figure 5A:
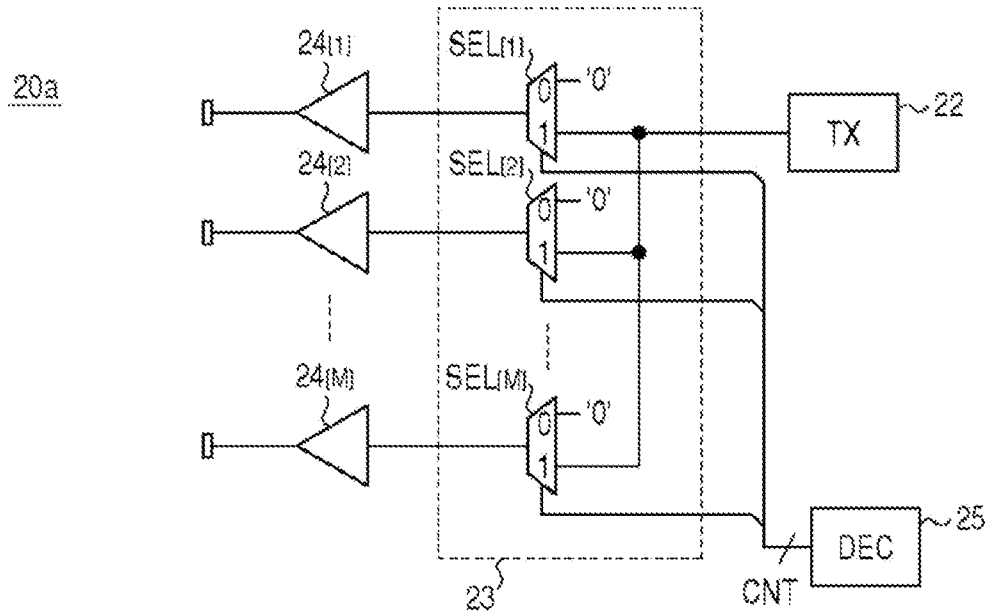
FIGS. 5A to 5C are circuit diagrams showing example configurations of the transmitter circuit of FIG. 2.
Figure 5B:
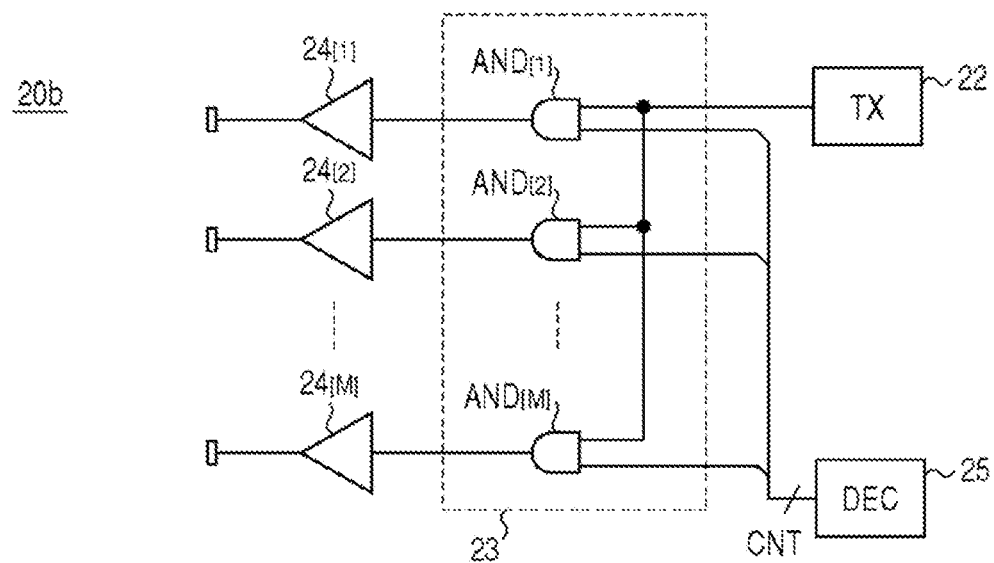
Figure 5C:
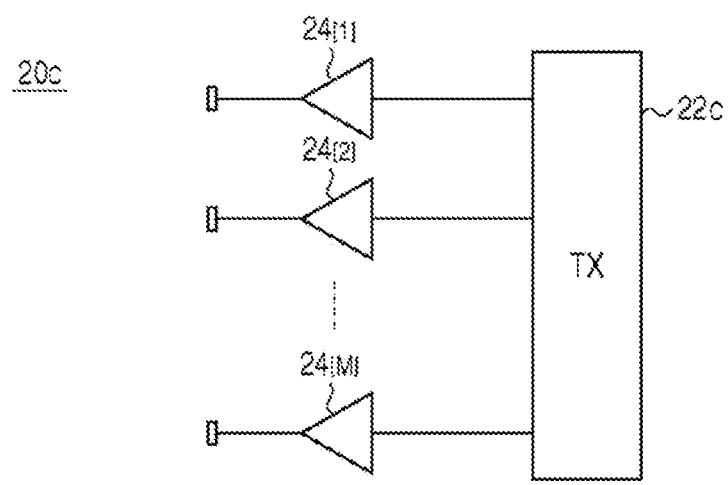

FIGS. 5A to 5C are circuit diagrams showing configurations of the transmitter circuit 20 of FIG. 2. Each of transmitter circuits 20a and 20b of FIGS. 5A and 5B, respectively, includes drivers $24_{[1 \text{ to } M]}$ provided for the respective transmitter electrodes $10_{[1 \text{ to } M]}$, a signal generator 22, a demultiplexer 23 and a decoder 25. The signal generator 22 generates a periodical signal (clock signal) to be applied to the transmitter electrodes 10 in each mode. The demultiplexer 23 receives the periodical signal from the signal generator 22 and distributes it to several selected ones of the drivers $24_{[1 \text{ to } M]}$. In the first mode for example, the demultiplexer 23 sequentially selects one of the plurality of drivers $24_{[1 \text{ to } M]}$ and outputs the periodical signal to the selected one of the drivers $24_{[1 \text{ to } M]}$.

The demultiplexer 23 of FIG. 5A includes a plurality of selectors $SEL_{[1]}$ to $SEL_{[M]}$. If a control signal CNT for an i-th selector $SEL_{[i]}$ is "1", an output of the selector $SEL_{[i]}$ corresponds to the periodical signal from the signal generator 22, which results in a state where the corresponding transmitter electrode $10_{[i]}$ is selected. On the contrary, if the control signal CNT for the i-th selector $SEL_{[i]}$ is "0", an output of the selector $SEL_{[i]}$ corresponds to zero, which results in a state where the corresponding transmitter electrode $10_{[i]}$ is not selected. The decoder 25 generates different control signals CNT depending on the mode and the number of groups.

The demultiplexer 23 of FIG. 5B includes logic gates (AND gates) instead of the selectors SEL of FIG. 5A. If a control signal CNT for an i-th AND gate $AND_{[i]}$ is "1", an output of the AND gate $AND_{[i]}$ corresponds to the periodical signal from the signal generator 22, which results in a state where the corresponding transmitter electrode $10_{[i]}$ is selected. On the contrary, if the control signal CNT for the i-th AND gate $AND_{[i]}$ is "0", an output of the AND gate $AND_{[i]}$ corresponds to zero, which results in a state where the corresponding transmitter electrode $10_{[i]}$ is not selected. The AND gates may be replaced with OR gates, in which case the logic of the control signal may be inverted.

A transmitter circuit 20c of FIG. 5C includes a plurality of drivers $24_{[1 \text{ to } M]}$ and a signal generator 22c. The signal generator 22c outputs a periodical signal to the plurality of drivers $24_{[1 \text{ to } M]}$ depending on the mode and the number of groups.

The configuration of the control circuit 100 has been described in the above. Subsequently, an operation thereof will be described for each mode.

<First Mode>

In the first mode, the plurality of transmitter electrodes $10_{[1 \text{ to } M]}$ is sequentially scanned. Accordingly, a spatial resolution for a first direction in which the transmitter electrode 10[1 to M] are arranged is maximized so that the electrostatic capacitive sensor 4 can be used as a typical touch panel sensor.

<Second Mode>

In the second mode, the plurality of transmitter electrodes $10_{[1 \text{ to } M]}$ is grouped. For example, if all of the transmitter electrodes $10_{[1 \text{ to } M]}$ are grouped in a single group, an apparent area of the transmitter electrodes 10 becomes substantially M times as large as that of the first mode. As a result, sensitivity can be greatly improved although the spatial resolution for the first direction may be lost. This allows for detection of a detection target such as a finger, a head, a stylus or the like in proximity to the panel and not contacting the panel.

In this manner, when the control circuit 100 according to this embodiment is set to the second mode, the electrostatic capacitive sensor 4 can be operated as a proximity sensor.

In addition, by changing the number of groups in the second mode, that is, the number of transmitter electrodes 10 to be simultaneously selected, it is possible to control the spatial resolution and the detection sensitivity which are in a trade-off relationship.

Figure 6A:
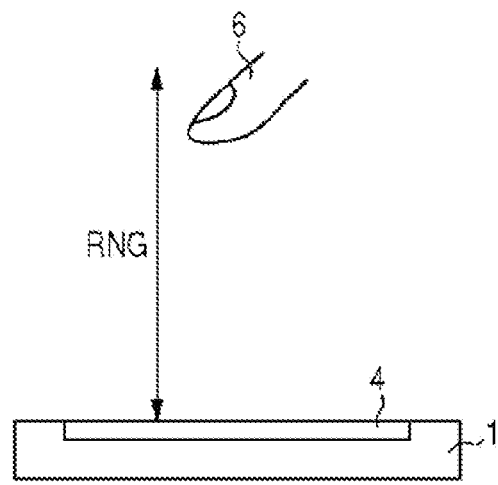
FIGS. 6A to 6C are views showing usage of an input device in each mode.
Figure 6B:
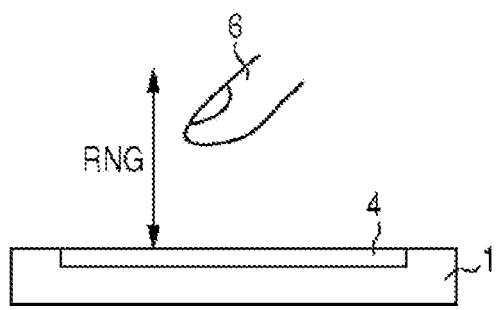
Figure 6C:
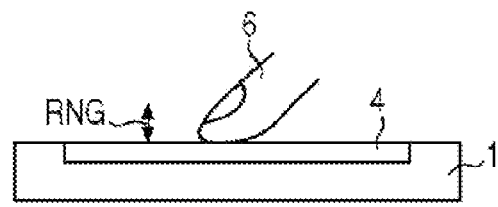

FIGS. 6A to 6C are views showing usage of the input device 2 in each mode. In each of FIGS. 6A to 6C, a detectable range RNG of the detection target 6 such as a user's finger is shown. FIG. 6A shows a case of the minimum number of groups in the second mode. In this case, the detectable range RNG is maximized so that the electrostatic capacitive sensor 4 can be used as a proximity sensor.

FIG. 6B shows a case when the number of groups is increased in the second mode. In this case, the detectable range RNG is decreased. Accordingly, a coordinate of the detection target 6 can be detected with a rough precision when it becomes closer to the electrostatic capacitive sensor 4 than in the case shown in FIG. 6A, although the coordinate can be detected while the detection target 6 does not contact with the electrostatic capacitive sensor 4. This usage is suitable for detection of a user's input manipulation at a position distant from the panel, which is called "hovering."

In addition, in the second mode, the increase in the number of groups helps to manipulation of the electronic equipment 1 by a gloved user. A gloved condition provides less change in mutual capacitances than an ungloved condition. On the other hand, the gloved condition requires no high spatial resolution. Accordingly, in this gloved condition, a comfortable input manipulation is enabled by appropriately setting the number of groups in the second mode. FIG. 6C shows a case where the number of groups is increased and the detectable range RNG is decreased than the case shown in FIG. 6B The following description is given to mode control. The controller 50 controls an operation mode of the transmitter circuit 20. When the transmitter circuit 20 is set to the second mode and the input device 2 acts as a proximity sensor, the input device 2 cannot act as a typical touch sensor due to a low spatial resolution for the first direction. In this case, the controller 50 may switch the operation status of the transmitter circuit 20 between (i) a first condition where the transmitter circuit 20 is fixedly set to the first mode and (ii) a second condition where the transmitter circuit 20 is set to alternate between the first mode and the second mode in a time-divisional manner.

Figure 7A:
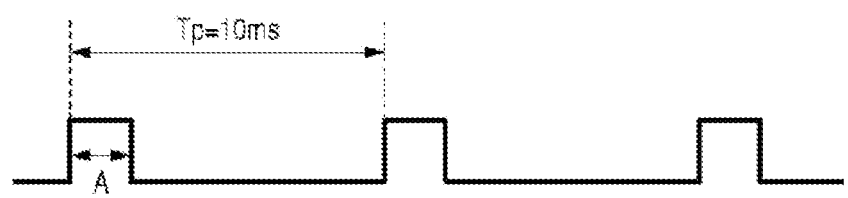
FIGS. 7A and 7B are operation waveform diagrams in first and second conditions, respectively.
Figure 7B:
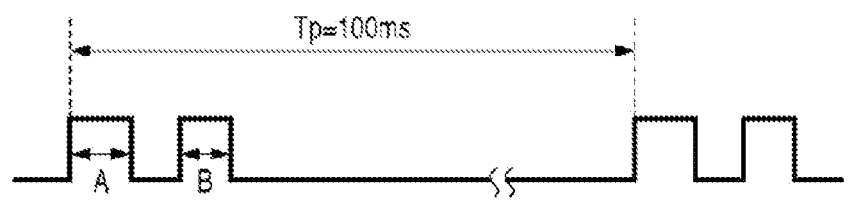

FIGS. 7A and 7B are operation waveform diagrams in the first and second conditions, respectively. In many cases, the input device 2 is not required to function as a proximity sensor during user's input manipulation by touch. In these cases, by setting the transmitter circuit 20 to the first condition, a touch input coordinate by a user is detected with the maximum spatial resolution. In FIGS. 7A and 7B, "A" denotes a period of time during which one frame is scanned in the first mode and "B" denotes a period of time during which one frame is scanned in the second mode. As shown in FIG. 7A, in the first condition, in order to detect a minute touch input at a high speed, a repetition period Tp is set to be short and a temporal resolution is set to be high. For example, Tp may be set to 10 ms or so.

On the other hand, if there is no touch input, the transmitter circuit 20 is set to the second mode and alternates between the first mode and the second mode in a time-divisional manner, so that the input device 2 can detect touch input while monitoring proximity of the detection target to the panel. i.e., acting as a proximity sensor. This can provide the same manipulation feeling as the case where a conventional touch sensor and an optical proximity sensor are used in combination. In addition, as shown in FIG. 7B, a repetition period Tp in the second condition may be set to be longer than that in the first condition. For example, the repetition period Tp in the second mode may be set to 100 ms or so. This can prevent power consumption in the second condition from being increased. When the touch input is detected in the second condition, the transmitter circuit 20 immediately makes a transition to the first condition to detect a subsequent touch input at a high speed.

Second Embodiment

In the first embodiment, the transmitter circuit 20 has been configured to switch between modes. On the contrary, in the second embodiment, the receiver circuit 26 is configured to switch between modes for control of sensitivity. In the following description, portions common to the first and second embodiments are incorporated by reference and explanation of which is not repeated.

The receiver circuit 26 is configured to switch between a first mode and a second mode. In the first mode, the receiver circuit 26 monitors reception signals $I_{RX[1]}$ to $I_{RX[N]}$ generated in a plurality of receiver electrodes $12_{[1\ to\ N]}$, respectively, and generates a detection signal Vs for each of the receiver electrodes 12.

In the second mode, the receiver circuit 26 groups the plurality of receiver electrodes $12_{[1-N]}$, connects the receiver electrodes 12 belonging to the same group in common, and generates a detection signal for each group. In addition, the receiver circuit 26 may be configured to change the number of groups in the second mode. In other words, the number of receiver electrodes 12 connected in common may be changed.

The controller 50 may switch the operation status of the receiver circuit 26 between a first condition where the receiver circuit 26 is fixedly set to the first mode and a second condition where the receiver circuit 26 is set to alternate between the first mode and the second mode in a time-divisional manner. The switching operation is the same as that in the first embodiment.

Figure 8A:
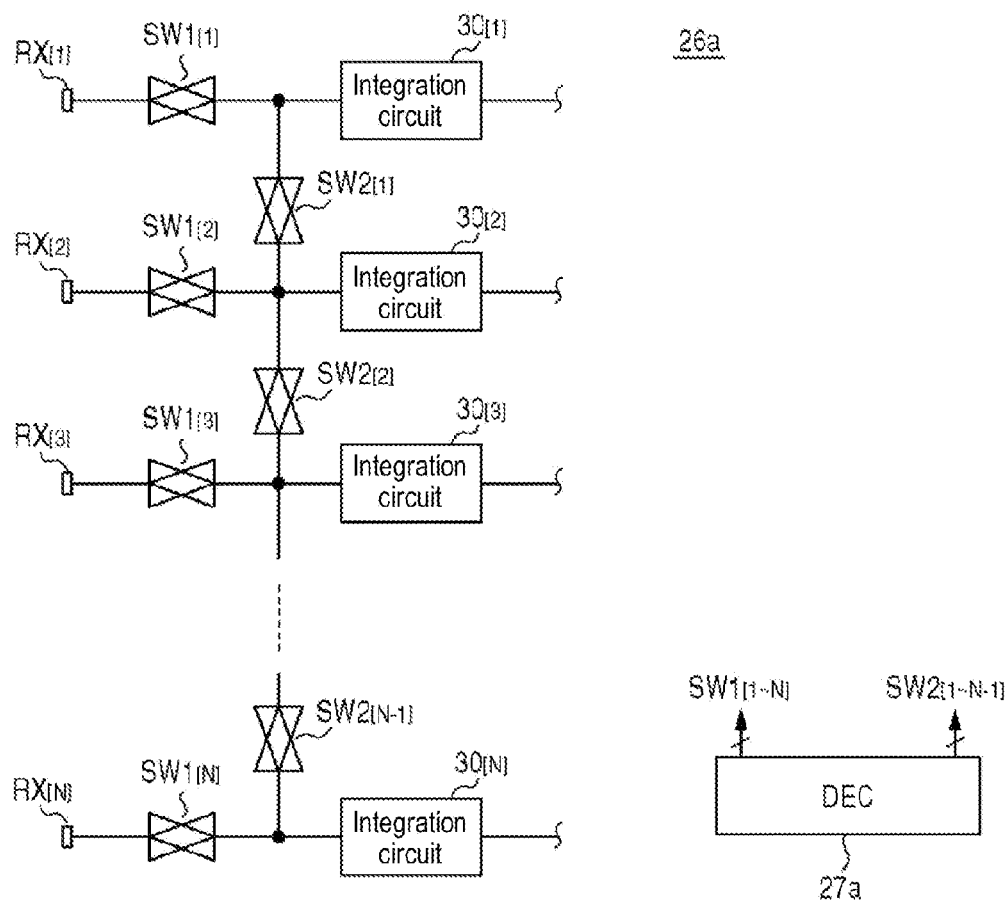
FIGS. 8A and 8B are circuit diagrams showing example configurations of receiver circuits of a control circuit according to a second embodiment.
Figure 8B:
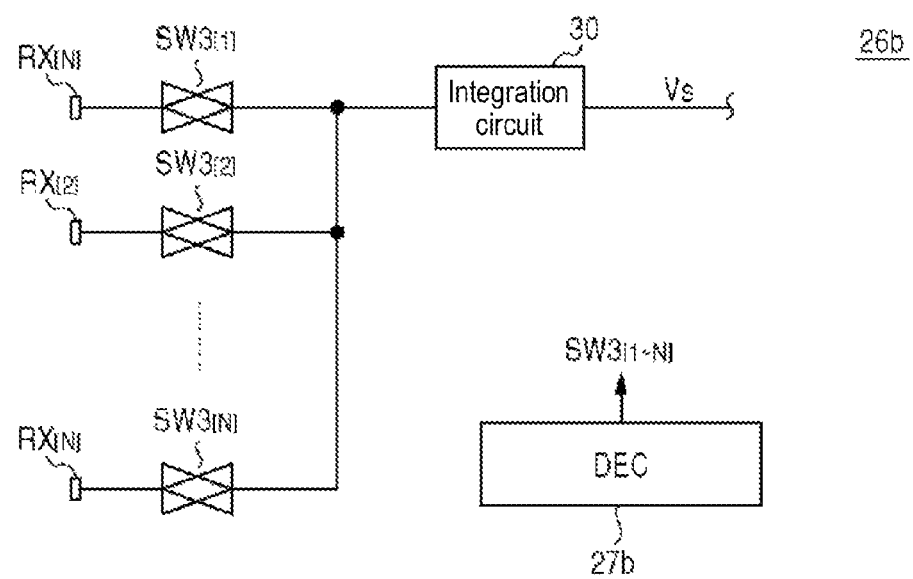

FIGS. 8A and 8B are circuit diagrams showing example configurations of the receiver circuits 26 of the control circuit 100 according to the second embodiment. A receiver circuit 26a of FIG. 8A includes integration circuits $30_{[1\ to\ N]}$ provided for the respective receiver electrodes $12_{[1\ to\ N]}$, a plurality of first analog switches $SW1_{[1\ to\ N]}$, a plurality of second analog switches $SW2_{[1\ to\ N-1]}$ and a decoder 27a.

A j-th first analog switch $SW1_{[j]}$ is interposed between a corresponding receiver (RX) terminal $RX_{[j]}$ and an input terminal of a corresponding integration circuit $30_{[j]}$. A j-th second analog switch $SW2_{[j]}$ is interposed between the input terminal of the corresponding integration circuit $30_{[j]}$ and an adjacent integration circuit $30_{[j+1]}$. A decoder 27a controls the analog switches SW1 and SW2 depending on the mode. Specifically, in the first mode, all of the first analog switches $SW1_{[1\ to\ N]}$ are switched on and all of the second analog switches $SW2_{[1\ to\ N-1]}$ are switched off.

In the second mode, one integration circuit 30 is allocated for each group. When an integration circuit $30_{[j]}$ is allocated to a group, the switches SW1 and SW2 interposed between all receiver electrodes 12 and the integration circuit $30_{[j]}$ are switched on.

In a receiver circuit 26b of FIG. 8B, the plurality of receiver electrodes $12_{[1-N]}$ shares the less number of integration circuits 30. The number of integration circuits 30 may be one, two or four. A j-th third analog switch $SW3_{[j]}$ is interposed between the corresponding RX terminal $RX_{[j]}$ and an input terminal of a corresponding integration circuit 30. A decoder 27b controls the third analog switches $SW3_{[1\ to\ N]}$.

In the first mode, N number of third analog switches $SW3_{[1\ to\ N]}$ are sequentially switched on. In the second mode, if the number of groups is one, all of the N number of third analog switches $SW3_{[1\ to\ N]}$ are switched on simultaneously. In the second mode, if the number of groups is two or more, these groups are processed in a time-divisional manner. During a period of time when a j-th group is processed, the third analog switches SW3 interposed between the plurality of receiver electrodes 12 belonging to the j-th group and the integration circuit 30 belonging to the j-th group is switched on.

The configuration of the control circuit 100 according to the second embodiment has been described in the above. The following description is given to an operation of the control circuit 100 for each mode.

<First Mode>

In the first mode, reception signals $I_{RX[i\ to\ N]}$ generated by the plurality of receiver electrodes $12_{[1\ to\ N]}$ are individually integrated to generate detection voltages $Vs_{[1\ to\ N]}$. Accordingly, a spatial resolution for the second direction in which the receiver electrodes $12_{[1\ to\ N]}$ are arranged is maximized so that the electrostatic capacitive sensor 4 can be used as a typical touch panel sensor.

<Second Mode>

In the second mode, the plurality of receiver electrodes $12_{[1\ to\ N]}$ is grouped. For example, if all of the receiver electrodes $12_{[1\ to\ N]}$ are grouped in a single group, the apparent area of the receiver electrodes 12 becomes substantially N times as large as that of the first mode. As a result, sensitivity can be greatly improved although the spatial resolution for the second direction may be lost. This allows for detection of a detection target such as a finger, a head, a stylus or the like in proximity to the panel and not contacting the panel.

In this manner, when the control circuit 100 according to this embodiment is set to the second mode, the electrostatic capacitive sensor 4 can be operated as a proximity sensor.

In addition, by changing the number of groups in the second mode, that is, the number of receiver electrodes 12 connected in common, it is possible to control the spatial resolution and the detection sensitivity which are in a trade-off relationship.

Third Embodiment

FIG. 9 is a matrix table showing the mode combinations of a transmitter circuit and a receiver circuit based on the conditions set by the controller according to a third embodiment. A third embodiment is a combination of the first and second embodiments, in which the transmitter circuit 20 and the receiver circuit 26 are independently configured to switch between the first mode and the second mode.

The controller 50 may switch the operation status of the transmitter circuit 20 and the receiver circuit 26 under a first condition where the transmitter circuit 20 and the receiver circuit 26 are fixedly set to the first mode or the transmitter circuit 20 and the receiver circuit 26 are fixedly set to the second mode.

The controller 50 may switch the operation status of the transmitter circuit 20 and the receiver circuit 26 under a second condition where the transmitter circuit 20 and the receiver circuit 26 are set to alternate between the first mode and the second mode in a time-divisional manner.

When both of the transmitter circuit 20 and the receiver circuit 26 are set to the first mode under the first condition, the resolutions for the first and second directions are maximized so that the electrostatic capacitive sensor 4 can be used as a typical touch panel sensor. When the transmitter circuit 20 and the receiver circuit 26 are set to the first mode and the second mode under the second condition, respectively, sensitivity can be improved with a high resolution for the first direction. When the transmitter circuit 20 and the receiver circuit 26 are set to the second mode and the first mode under the second condition, respectively, sensitivity can be improved with a high resolution for the second direction. When both of the transmitter circuit 20 and the receiver circuit 26 are set to the second mode under the first condition, sensitivity can be further improved.

According to the third embodiment, by controlling a combination of the modes of the transmitter circuit 20 and the receiver circuit 26 through the controller 50, it is possible to control the sensitivity and the spatial resolution more flexibly than the first and second embodiments.

The control circuit 100 according to the first to third embodiments has been described in the above. The following description is given to usage of the control circuit 100.

Figure 10:
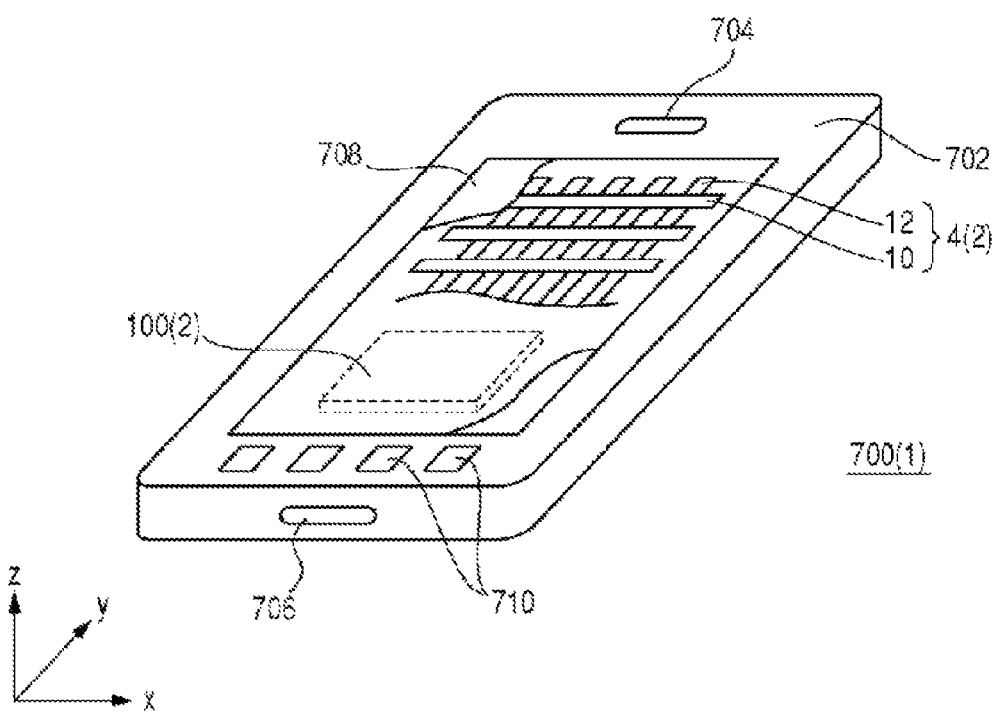
FIG. 10 is a perspective view showing a mobile terminal as one example of electronic equipment having a control circuit.

FIG. 10 is a perspective view showing a mobile phone 700 as one example of the electronic equipment 1 having the control circuit 100. The mobile phone 700 includes a housing 702, a speaker 704, a microphone 706, a protective glass 708, manipulation buttons 710, the electrostatic capacitive sensor 4 and the control circuit 100. The speaker 704 outputs a voice of a called party in calling. The microphone 706 collects voice of a user of the mobile phone 700 in calling. The electrostatic capacitive sensor 4 is disposed on the top side of a display panel (not shown), and the surface of the electrostatic capacitive sensor 4 is covered by the protective glass 708. The manipulation buttons 710 serve as an input device to allow a user to operate the mobile phone 700. The control circuit 100 is connected with transmitter electrodes 10 and the receiver electrodes 12 via wires (not shown). In FIG. 10, the transmitter electrodes 10 extend in parallel to a short side of the housing 702 (that is, in an x-axis direction) and the receiver electrodes 12 extend in parallel to a long side thereof (that is, a y-axis direction). This arrangement of the transmitter electrodes 10 and the receiver electrodes 12 may be interchangeable.

The configuration of the mobile phone 700 has been described in the above. The mobile phone 700 eliminates a need of a dedicated proximity sensor using a light emitting device or the like, because the electrostatic capacitive sensor 4 can be operated as both a touch panel and a proximity sensor through mode switching. Accordingly, production costs of the mobile phone 700 can be reduced and the housing 702 of the mobile phone 700 can be flexibly designed without being restricted by a proximity sensor.

Subsequently, unique characteristics of proximity detection of the mobile phone 700 or similar electronic equipment will be described.

<Side Head Proximity Detection>

Although the electrostatic capacitive sensor 4 can be used as a proximity sensor in the input device 2 according to the above described embodiments, the mobile phone 700 shown in FIG. 10 requires a function of detecting proximity of the housing 702 to a side head of a user. In this case, there is a need to distinguish a condition where a user puts the housing 702 in proximity to the side head (hereinafter referred to as a "side head proximity condition") from other conditions such as a condition where a user covers the input device 2 with hands at the vicinity of the surface of the protective glass 708 or a condition where the user grips the housing 702. A technique for detecting the side head proximity condition will be described below.

Figure 11A:
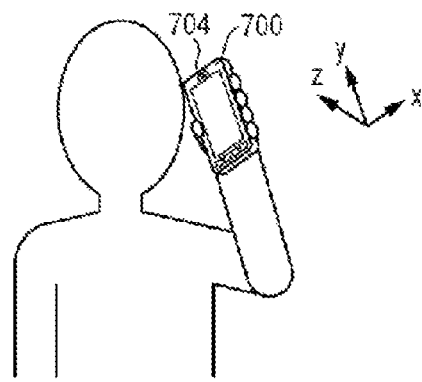
FIG. 11A is a view showing a side head proximity condition and FIG. 11B is a view showing an output of a capacitive sensor unit under the side head proximity condition.
Figure 11B:
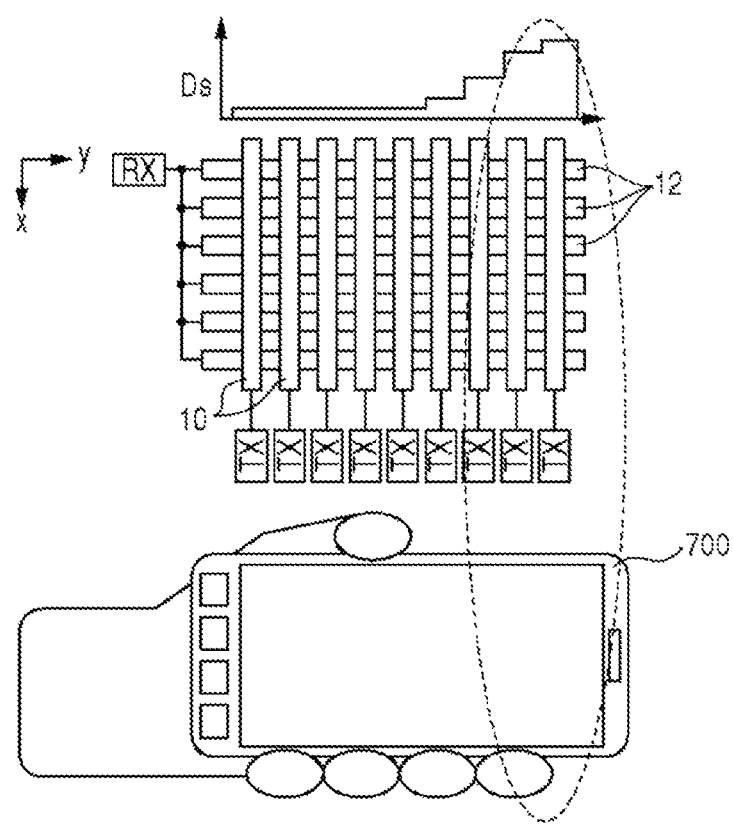

FIG. 11A is a view showing a side head proximity condition and FIG. 11B is a view showing an output of the electrostatic capacitive sensor 4 under the side head proximity condition. As shown in FIG. 11A, in the side head proximity condition during a calling, the speaker 704 approaches a user' ear. Accordingly, as shown in FIG. 11B, a change in capacitance at the vicinity of the speaker 704 increases and a change in capacitance in the side of the microphone 706 decreases.

Thus, when detecting the side head proximity condition, at least one of the transmitter circuits 20 and the receiver circuit 26 of the control circuit 100 is set to the second mode so that it can have a spatial resolution in the long side direction (y-axis direction) of the housing 702. In the example of FIG. 11B, the receiver circuit 26 is set to the second mode and all of the receiver electrodes 12 are grouped into the same group. On the other hand, the transmitter circuit 20 is set to the first mode so that it can have a spatial resolution in the y-axis direction.

If the transmitter electrodes 10 and the receiver electrodes 12 are arranged in reverse, the transmitter circuit 20 and the receiver circuit 26 may be set to the second mode and the first mode, respectively.

The controller 50 of the control circuit 100 or the processor 3 receiving an output from the control circuit 100 detects the side head proximity condition based on a digital value Ds corresponding to a sensor output (also referred to as "sensor output Ds"). Specifically, if a change in capacitance in the y-axis direction is large in the vicinity of the speaker 704 that approaches the user' ear when calling and small in the vicinity of the microphone 706, it is determined that the mobile phone 700 is in the side head proximity condition. This determination may be made by comparing the digital value Ds having a spatial resolution in the y-axis direction with a predetermined pattern.

In this manner, when the electrostatic capacitive sensor 4 is operated as a proximity sensor, the side head proximity condition can be detected by providing the electrostatic capacitive sensor 4 with a spatial resolution in the long side of the housing 702.

Figure 12A:
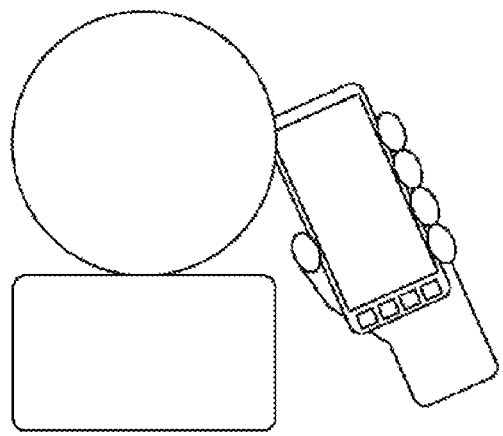
FIGS. 12A to 12C are views for explaining the side head proximity condition.
Figure 12B:
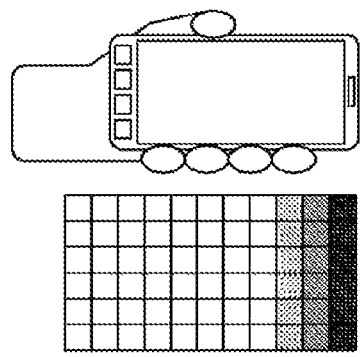
Figure 12C:
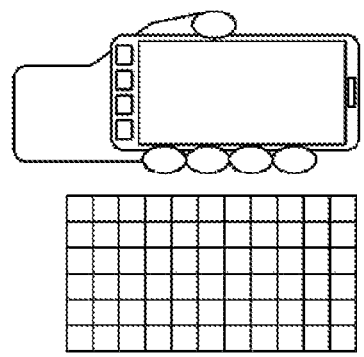
Figure 13A:
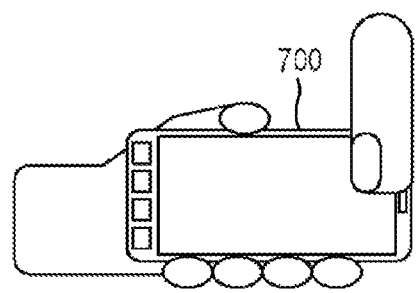
FIGS. 13A to 13C are views for explaining a condition where a user touches the vicinity of a calling speaker of a capacitive sensor unit.
Figure 13B:
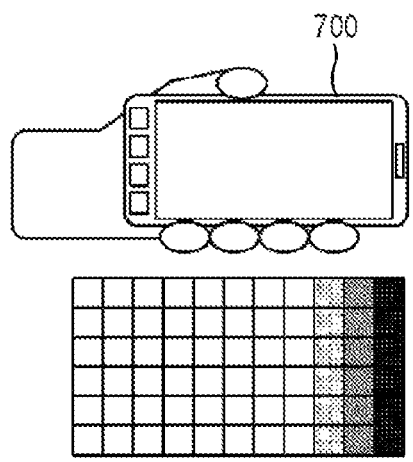
Figure 13C:
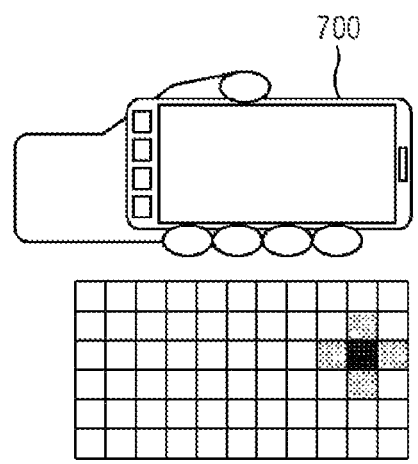

FIGS. 12A to 12C are views for explaining the side head proximity condition. FIG. 12A shows a state of the mobile phone 700, FIG. 12B shows a sensor output Ds from a proximity sensor having a spatial resolution in the y-axis direction, and FIG. 12C shows a sensor output Ds from a touch sensor. FIGS. 13A to 13C are views for explaining a condition where a user touches the vicinity of the speaker 704 of the electrostatic capacitive sensor 4. FIG. 13A shows a state of the mobile phone 700, FIG. 13B shows a sensor output Ds from a proximity sensor having a spatial resolution in the y-axis direction, and FIG. 13C shows a sensor output Ds from a touch sensor.

As shown in FIGS. 12B and 13B, there may be some cases where the two conditions shown in FIGS. 12A and 13A cannot be distinguished with only a spatial resolution in the y-axis direction. In these cases, as shown in FIG. 13C, the two conditions can be distinguished by operating the electrostatic capacitive sensor 4 as a touch sensor so that it can have spatial resolutions in both the x-axis and y-axis directions. When the electrostatic capacitive sensor 4 is operated in the second condition as shown in FIG. 7B, the electrostatic capacitive sensor 4 can distinguish the condition of FIG. 12A and the condition of FIG. 13A because the electrostatic capacitive sensor unit 4 acts as a proximity sensor having a spatial resolution in the y-axis direction and as a touch sensor having spatial resolutions in the x-axis and y-axis directions.

<Grip Detection>

Figure 14A:
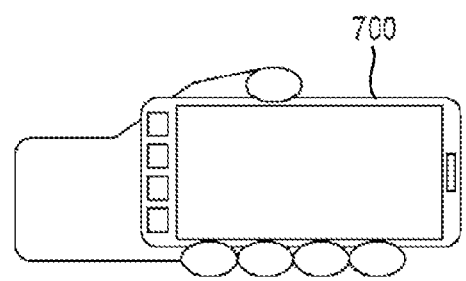
FIG. 14A is a view showing a grip condition and FIG. 14B is a view showing an output of a capacitive sensor unit under the grip condition.
Figure 14B:
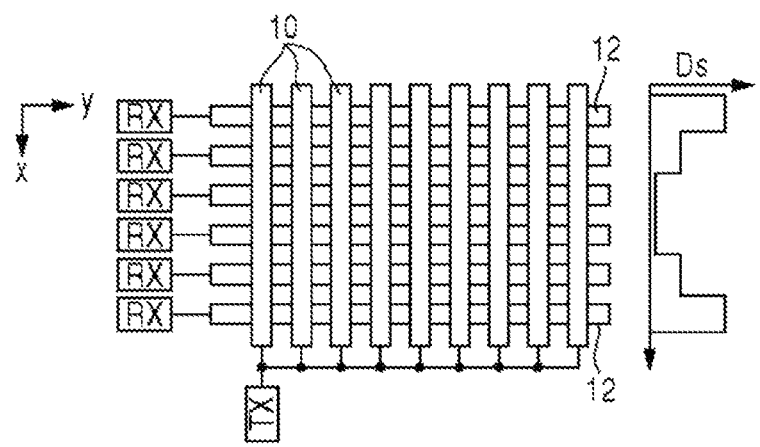

In electronic equipment such as the mobile phone 700, there are some cases in which a condition where a user grips a housing is required to be detected. FIGS. 14A and 14B show that an input device 2 according to the embodiments can be also used for a grip sensor. FIG. 14A is a view showing a grip condition and FIG. 14B is a view showing an output of the electrostatic capacitive sensor 4 under the grip condition. In the grip condition as shown in FIG. 14A, a change in capacitance of the receiver electrodes 12 at one end of a display to which a user' thumb approaches and of the receiver electrodes 12 at the other end of the display to which the other fingers approach increases, while a change in capacitance of the receiver electrodes 12 disposed in the center of the display decreases.

Thus, when the grip condition is detected, at least one of the transmitter circuit 20 and the receiver circuit 26 of the control circuit 100 is set to the second mode so that it can have a spatial resolution in the short side direction (x-axis direction) of the housing 702. In the example of FIG. 14B, the transmitter circuit 20 is set to the second mode and all of the transmitter electrodes 10 are grouped into the same group. On the other hand, the receiver circuit 26 is set to the first mode so that it can have a spatial resolution in the x-axis direction.

If the transmitter electrodes 10 and the receiver electrodes 12 are arranged in reverse, the transmitter circuit 20 and the receiver circuit 26 may be set to the first mode and the second mode, respectively.

The controller 50 of the control circuit 100 or the processor 3 receiving an output from the control circuit 100 detects the grip condition based on the digital value Ds corresponding to the sensor output. Specifically, if a change in capacitance in both ends at the vicinity of the lower and the upper limit of x coordinates is large, it is determined that the mobile phone 700 is in the grip condition. This determination may be made by comparing the digital value Ds having a spatial resolution in the x-axis direction with a predetermined pattern.

In this manner, when the electrostatic capacitive sensor 4 is operated as a proximity sensor, the grip condition can be detected by providing the electrostatic capacitive sensor 4 with a spatial resolution in the short side of the housing 702.

In the above, the present disclosure has been described by way of specific embodiments. The disclosed embodiments are merely examples and it is to be understood by those skilled in the art that combinations of elements and processes of the embodiments can be modified in various ways and such modification falls within the scope of the present disclosure. The following description is given to such modification.

Although an operation of setting the transmitter circuit 20 or the receiver circuit 26 to the second mode when the electrostatic capacitive sensor 4 is used as a proximity sensor has been illustrated in the above embodiments, the present disclosure is not limited thereto. For example, when the electrostatic capacitive sensor 4 is used as a touch sensor, the transmitter circuit 20 or the receiver circuit 26 may be set to the second mode and a plurality (for example, two) of the transmitter circuits 20 or the receiver circuits 26 may be allocated for each group. In this case, the amplitude of the reception signal $I_{RX}$ is increased, which may result in reduction of the number of integrations performed by the integration circuit 30 and power consumption in the integration circuit 30. In this case, since a spatial resolution in the touch sensor is decreased, such setting may be performed under a condition where a high spatial resolution is not required (for example, in a case where an icon on a home screen of the mobile phone 700 is selected).

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of an electrostatic capacitive sensor including a plurality of transmitter electrodes disposed in parallel in a first direction and a plurality of receiver electrodes disposed in parallel in a second direction, and spaced apart from the plurality of transmitter electrodes by specific intervals, the control circuit comprising:

a transmitter circuit configured to apply a periodical transmission signal to each of the plurality of transmitter electrodes;

a receiver circuit configured to generate, based on a reception signal generated in each of the plurality of receiver electrodes in response to the transmission signal, a detection signal indicating a change in electrostatic capacitance formed at each of intersections of the plurality of transmitter electrodes and the plurality of receiver electrodes; and a controller configured to control operation modes of the transmitter circuit and the receiver circuit, wherein the transmitter circuit is configured to switch between a first mode, where the transmission signal is sequentially applied to the plurality of transmitter electrodes, and a second mode, where the plurality of transmitter electrodes are grouped into one or more groups and the transmission signal is simultaneously applied to transmitter electrodes belonging to the same group, wherein the receiver circuit is configured to switch between a first mode, where the reception signal generated in each of the plurality of receiver electrodes is sequentially monitored to generate the detection signal for each of the receiver electrodes, and a second mode, where the plurality of receiver electrodes are grouped into one or more groups and receiver electrodes belonging to the same group are connected in common to generate the detection signal for each group, and wherein the controller switches between a first condition, where the transmitter circuit and the receiver circuit are fixedly set to the first mode, and a second condition, where the transmitter circuit and the receiver circuit are set to alternate between the first mode and the second mode in a time-divisional manner.

2. The control circuit of claim 1, wherein the receiver circuit is configured such that a number of the one or more groups can be changed in the second mode.

* * * * *